United States Patent
Melzer et al.

(10) Patent No.: US 11,550,028 B2
(45) Date of Patent: Jan. 10, 2023

(54) RADAR SENSOR HAVING MULTIPLE RADAR CHIPS

(71) Applicant: Infineon Technologies AG, Neubiberg (DE)

(72) Inventors: Alexander Melzer, Neutillmitsch (AT); Bernhard Greslehner-Nimmervoll, Hagenberg i.M. (AT); Clemens Pfeffer, Linz (AT)

(73) Assignee: Infineon Technologies AG, Neubiberg (DE)

( * ) Notice: Subject to any disclaimer, the term of this patent is extended or adjusted under 35 U.S.C. 154(b) by 552 days.

(21) Appl. No.: 16/511,769

(22) Filed: Jul. 15, 2019

(65) Prior Publication Data
US 2020/0025870 A1 Jan. 23, 2020

(30) Foreign Application Priority Data
Jul. 17, 2018 (DE) .......................... 102018117202.8

(51) Int. Cl.
*G01S 7/03* (2006.01)
*G01S 7/35* (2006.01)
*G01S 13/93* (2020.01)

(52) U.S. Cl.
CPC ................ *G01S 7/032* (2013.01); *G01S 7/35* (2013.01); *G01S 13/93* (2013.01)

(58) Field of Classification Search
CPC ............. G01S 7/032; G01S 7/35; G01S 13/93
See application file for complete search history.

(56) References Cited

U.S. PATENT DOCUMENTS

| | | | | |
|---|---|---|---|---|
| 2016/0187462 | A1* | 6/2016 | Altus ........................ | G01S 7/35 342/175 |
| 2017/0315214 | A1* | 11/2017 | Steinbuch ............. | G01S 7/4017 |
| 2018/0031688 | A1* | 2/2018 | Hesse .................... | G01S 7/4008 |
| 2018/0074173 | A1* | 3/2018 | Trotta .................... | H01Q 1/525 |
| 2018/0351250 | A1* | 12/2018 | Achour ................. | H01Q 21/064 |
| 2019/0044485 | A1* | 2/2019 | Rao ........................ | H01Q 1/2283 |
| 2019/0049554 | A1* | 2/2019 | Parrini .................... | H03L 7/099 |
| 2019/0129002 | A1* | 5/2019 | Roger ................... | G01S 13/931 |

* cited by examiner

*Primary Examiner* — Marcus E Windrich
(74) *Attorney, Agent, or Firm* — Harrity & Harrity, LLP (57) ABSTRACT

The description below relates to a method for a radar sensor. According to one example implementation, the method comprises receiving configuration data and storing the received configuration data in a first radar chip having multiple transmission channels. The configuration data contain multiple parameter sets for a chirp sequence and association information representing an association of a respective chirp of the chirp sequence with one of the multiple parameter sets. The method further comprises receiving a trigger signal in the first radar chip. The trigger signal indicates the beginning of a respective chirp of the chirp sequence. The transmission channels mentioned are repeatedly configured in sync with the trigger signal, wherein for each chirp of the chirp sequence the transmission channels are configured according to the respective association information. The method further comprises receiving an RF oscillator signal representing the chirp sequence, and supplying the RF oscillator signal to the accordingly configured transmission channels.

20 Claims, 6 Drawing Sheets

RADAR SENSOR HAVING MULTIPLE RADAR CHIPS

RELATED APPLICATION

This application claims priority under 35 U.S.C. § 119 to German Patent Application No. 102018117202.8, filed on Jul. 17, 2018, the contents of which are incorporated by reference herein in their entirety.

TECHNICAL FIELD

The present description relates generally to the field of radar sensors, and to a radar sensor having multiple radar chips.

BACKGROUND

Radio-frequency (RF) transmitters and receivers are found in a multiplicity of applications, in particular in the field of wireless communication and radar sensors. In the automotive sector, there is an increasing need for radar sensors, which can be used in driving assistance systems (Advanced driver assistance systems, ADAS) such as e.g. in adaptive cruise control (ACC, or Radar Cruise Control) systems inter alia. Such systems can automatically adapt the speed of an automobile so as to keep a safe distance from other automobiles traveling ahead (and from other objects and from pedestrians). Further applications in the automotive sector are e.g. blind spot detection, lane change assist and the like.

Modern radar systems use large scale integrated RF circuits that can combine all the core functions of an RF frontend of a radar transceiver in a single chip package (Single-Chip Transceiver). RF frontends of this kind can have an RF local oscillator (LO), power amplifiers, low noise amplifiers (LNA) or mixers inter alia.

Frequency-modulated continuous-wave (FMCW) radar systems use radar signals containing sequences of what are known as chirps. To produce such chirps, the radar apparatus can have a local oscillator that has a VCO arranged in a phase-locked loop (PLL). Usually, a measurement involves a chirp sequence being transmitted via multiple transmission antennas.

In particular in the case of high resolution radar systems having a multiplicity of antennas, the RF frontend can be distributed over multiple semiconductor chips (what are known as monolithic microwave integrated circuits (MMIC)). By way of example, transmission channels can be integrated in one or more separate radar chips (transmitter MMIC), while at least some of the reception channels and the local oscillator for generating the RF signal with the chirp sequence are integrated in another radar chip (master MMIC). A radar system having multiple MMICs entails a few challenges that do not arise with a single-chip radar.

SUMMARY

The description below relates to a method for a radar sensor. According to one example implementation, the method comprises receiving configuration data and storing the received configuration data in a first radar chip having multiple transmission channels. The configuration data contain multiple parameter sets for a chirp sequence and association information representing an association of a respective chirp of the chirp sequence with one of the multiple parameter sets. The method further comprises receiving a trigger signal in the first radar chip. The trigger signal indicates the beginning of a respective chirp of the chirp sequence. The aforementioned transmission channels are repeatedly configured in sync with the trigger signal, wherein for each chirp of the chirp sequence the transmission channels are configured according to the respective association information. The method further comprises receiving an RF oscillator signal representing the chirp sequence, and supplying the RF oscillator signal to the accordingly configured transmission channels.

In addition, a radar chip is described. According to one example implementation, the radar chip has the following: an RF chip contact for receiving an external RF radar signal representing a chirp sequence having a multiplicity of chirps, and a further chip contact for receiving an external trigger signal. The trigger signal indicates the beginning of a respective chirp of the chirp sequence. The radar chip has, in addition, multiple transmission channels coupled to the RF chip contact and designed to receive the RF radar signal. In addition, there is provision for a communication interface for receiving configuration data. The configuration data contain multiple parameter sets for a chirp sequence and association information representing an association of a respective chirp of the chirp sequence with one of the multiple parameter sets. The radar chip further has a configuration circuit coupled to the communication interface in order to receive the configuration data, and coupled to the further chip contact in order to receive the trigger signal. The configuration circuit is designed to repeatedly configure the transmission channels in sync with the trigger signal, and wherein for each chirp of the chirp sequence the transmission channels are configured according to the respective association information.

In addition, a radar apparatus having one or more of the aforementioned radar chips and a master chip is described.

BRIEF DESCRIPTION OF THE DRAWINGS

Example implementations are explained more specifically below with reference to figures. The depictions are not necessarily to scale and the example implementations are not restricted just to the depicted aspects. Rather, importance is placed on depicting the principles on which the example implementations are based. In the figures.

DETAILED DESCRIPTION

Figure 1:
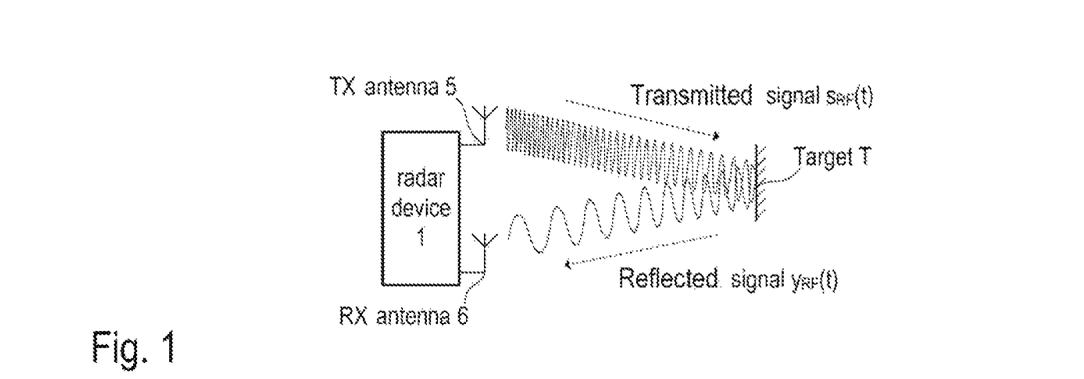
FIG. 1 is a sketch to illustrate the operating principle of an FMCW radar system for distance and/or speed measurement.

FIG. 1 uses a schematic diagram to illustrate the use of an FMCW radar system, as a sensor for measuring distances and speeds of objects, which are usually referred to as radar targets. In the present example, the radar apparatus 1 has separate transmission (TX) and reception (RX) antennas 5 and 6 (bistatic or pseudo-monostatic radar configuration). However, it should be noted that one or more antennas can also be used that are simultaneously used both as transmission antennas and reception antennas (monostatic radar configuration). In the present example, the transmission antenna 5 emits a continuous RF signal $s_{RF}(t)$, which is frequency modulated with a type of sawtooth signal (periodic, linear frequency ramp), for example. The emitted signal $s_{RF}(t)$ is backscattered from the radar target T and the backscattered/reflected signal $y_{RF}(t)$ is received by the reception antenna 6. FIG. 1 shows a simplified example; in practice, radar sensors are systems having a multiplicity of transmission (TX) and reception (RX) channels in order also to be able to determine the angle of incidence (Direction of Arrival, DoA) of the backscattered/reflected signal $y_{RF}(t)$ and therefore to locate the radar target T with the desired resolution.

Figure 2:
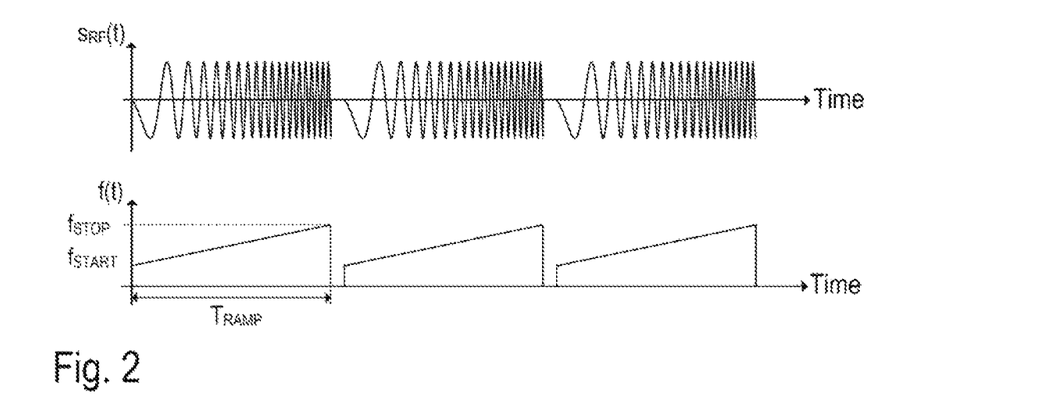
FIG. 2 comprises two timing diagrams to illustrate the frequency modulation (FM) of the RF signal generated by the FMCW system.

FIG. 2 provides an example illustration of the aforementioned frequency modulation of the signal $s_{RF}(t)$. As depicted in FIG. 2 (upper graph), the emitted RF signal $s_{RF}(t)$ is made up of a set of "chirps", e.g. the signal $s_{RF}(t)$ comprises a sequence of sinusoidal signal characteristics (waveforms) with a rising frequency (Up-Chirp) or a falling frequency (Down-Chirp). In the present example, the instantaneous frequency f(t) of the chirps rises linearly, beginning at a starting frequency $f_{START}$, to a stop frequency $f_{STOP}$ within a period $T_{RAMP}$ (see lower graph in FIG. 2). Such chirps are also referred to as linear frequency ramps. FIG. 2 depicts three identical linear frequency ramps. However, it should be noted that the parameters $f_{START}$, $f_{STOP}$, $T_{RAMP}$ and the pause between the individual frequency ramps can vary. The frequency variation should also not necessarily be linear (linear chirp). Depending on the implementation, it is also possible for transmission signals having exponential or hyperbolic frequency variation (exponential or hyperbolic chirps) to be used, for example. In many applications, sequences of linear chirps are used, however.

Figure 3:
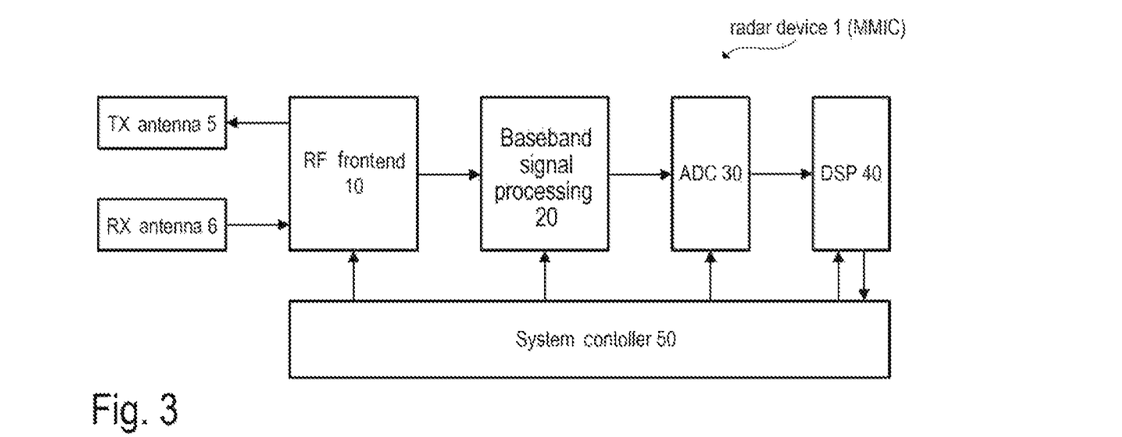
FIG. 3 is a block diagram to illustrate the fundamental structure of an FMCW radar system.

FIG. 3 is a block diagram providing an example depiction of a possible structure of a radar apparatus 1 (radar sensor). Accordingly, at least one transmission antenna 5 (TX antenna) and at least one reception antenna 6 (RX antenna) are connected to an RF frontend 10, integrated in a radar chip (MMIC), that can contain all those circuit components that are needed for the RF signal processing. These circuit components comprise, by way of example, a local oscillator (LO), RF power amplifiers, low-noise amplifiers (LNA), directional couplers (e.g. rat-race couplers, circulators, etc.) and mixers for down-conversion of the RF signals to baseband or to an intermediate frequency band (IF band).

The example depicted in FIG. 3 shows a bistatic (or pseudo-monostatic) radar system having separate RX and TX antennas. In the case of a monostatic radar system, a single antenna would be used both for emitting and for receiving the electromagnetic (radar) signals. In this case, a directional coupler (e.g. a circulator) can be used to separate the RF signals to be emitted from the received RF signals (radar echo signals). As mentioned, radar systems in practice usually have multiple transmission and reception channels (TX/RX channels) having multiple TX and RX antennas, which allows measurement of the direction (DoA) from which the radar echoes are received, inter alia. In such MIMO systems, the individual TX channels and RX channels are usually each of identical or similar design.

In the case of an FMCW radar system, the RF signals emitted via the TX antenna 5 can be e.g. in the range from approximately 20 GHz to 100 GHz (e.g. around 77 GHz in some applications). As mentioned, the RF signal received by the RX antenna 6 comprises the radar echoes (chirp echo signals), e.g. those signal components that are backscattered from one or more radar targets. The received RF signal $y_{RF}(t)$ is e.g. down-converted to baseband (or an IF band) and processed further in baseband using analog signal processing (see FIG. 3, analog baseband signal processing chain 20). Said analog signal processing in baseband substantially comprises filtering and if need be amplification of the baseband signal. The baseband signal is finally digitized (see FIG. 3, analog-to-digital converter 30) and processed further in the digital domain.

At least part of the digital signal processing chain can be realized as software that can be executed in a digital computing unit 40 (e.g. having a processor such as e.g. a microcontroller or a digital signal processor, see FIG. 3, DSP). The entire system is normally controlled using a system controller 50, at least part of which can likewise be implemented as software that can be executed on a computing unit (e.g. processor such as e.g. a microcontroller). The RF frontend 10 and the analog baseband signal processing chain 20 (and optionally also the analog-to-digital converter 30 and at least parts of the computing unit 40) can be integrated together in a single MMIC (e.g. an RF semiconductor chip). Alternatively, the individual components can also be distributed over multiple integrated circuits. When there are a large number of TX and RX channels and corresponding TX and RX antennas, e.g. the RF frontend can be distributed over multiple radar chips (MMICs) (see also FIG. 5). In some radar systems, the computing unit 40 processing the digitized radar signals can be at least partially "relocated" to a central computing unit.

Figure 4:
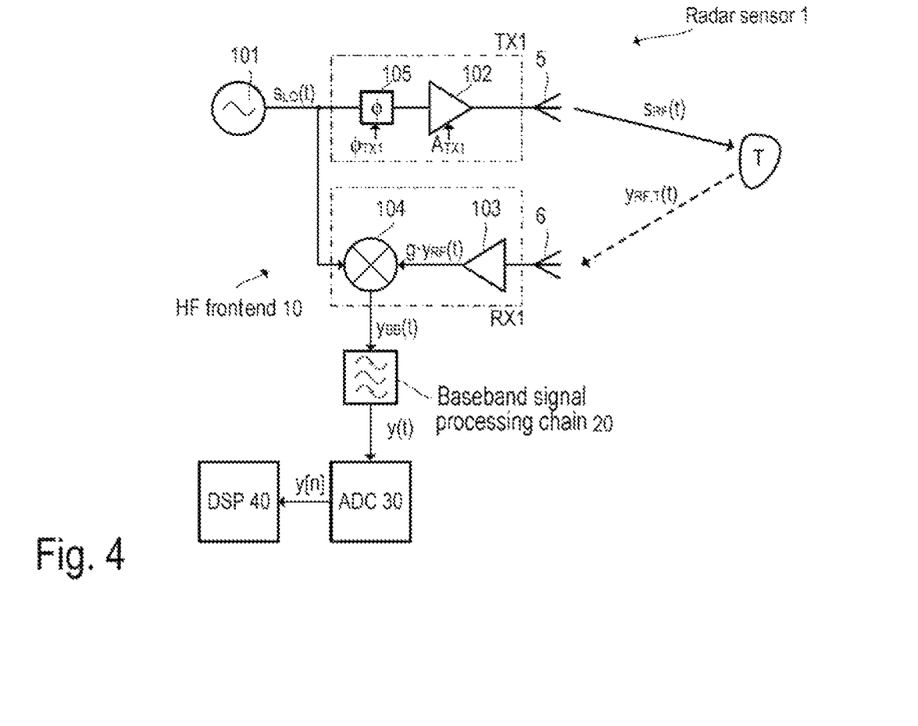
FIG. 4 is a block diagram to illustrate an example of an integrated RF frontend circuit of a radar chip, including analog baseband signal processing.

FIG. 4 illustrates an example implementation of a radar transceiver 1 according to the example from FIG. 3 in more detail. In the present example, in particular the RF frontend 10 of the radar transceiver 1 and the downstream signal processing in baseband are depicted. It should be noted that FIG. 4 depicts a simplified circuit diagram in order to show the fundamental structure of the RF frontend 10 with a TX channel and an RX channel. Actual implementations, which can be highly dependent on the specific application, can naturally be more complex and normally have a multiplicity of TX and RX channels of substantially the same type.

The RF frontend 10 comprises a local oscillator 101 (LO) that generates an RF oscillator signal $s_{LO}(t)$. The RF oscillator signal $s_{LO}(t)$ comprises, as described above with reference to FIG. 2, sequences of frequency-modulated chirps and is also referred to as an LO signal. In radar applications, the frequency $f_{LO}$ of the LO signal $s_{LO}(t)$ is usually in the SHF (Super High Frequency, centimeter wave) or EHF (Extremely High Frequency, millimeter wave) band, e.g. in a range from 76 GHz to 81 GHz for some automotive applications. The LO signal $s_{LO}(t)$ is processed both in the transmission signal path TX1 (in the TX channel) and in the reception signal path RX1 (in the RX channel). The local oscillator 101 usually contains a VCO connected up in a phase-locked loop (PLL). To adjust the LO frequency $f_{LO}$, the phase-locked loop can have e.g. a multi-modulus divider that is digitally actuated using a sigma-delta modulator. Local oscillators having phase-locked loops of this kind are known per se and are thus not explained in more detail in this case.

The transmission signal $s_{RF}(t)$ (cf. FIG. 2) emitted by the TX antenna 5 is generated by amplifying the LO signal $s_{LO}(t)$, for example using the RF power amplifier 102. Additionally, a phase shifter 105 in the TX channel can be used to adjust the phase $\phi_{TX1}$ of the emitted signal. The gain ATX1 of the amplifier 102 can likewise be adjustable. The transmission signal $s_{RF}(t)$ is therefore merely an amplified and possibly phase-shifted version of the LO signal $s_{LO}(t)$. Adjustment of the phase can be made in particular in a radar system having a multiplicity of TX channels. The output of the amplifier 102 can be coupled to the TX antenna 5.

The received signal $y_{RF}(t)$ received by the RX antenna 6 is supplied to the receiver circuit in the RX channel and hence directly or indirectly to the RF port of the mixer 104. In the present example, the RF received signal $y_{RF}(t)$ (antenna signal) is preamplified using the amplifier 103 (gain g). The mixer 104 accordingly receives the amplified RF received signal $g \cdot y_{RF}(t)$. The amplifier 103 can be e.g. an LNA. The reference port of the mixer 104 is supplied with the LO signal $s_{LO}(t)$, so that the mixer 104 down-converts the (preamplified) RF received signal $y_{RF}(t)$ to baseband. The signal down-converted to baseband (mixer output signal) is denoted by $y_{BB}(t)$. This baseband signal $y_{BB}(t)$ is initially processed further in analog fashion, wherein the analog baseband signal processing chain 20 substantially causes amplification and (e.g. bandpass or low-pass) filtering in order to reject undesirable side bands and intermediate frequencies. The resultant analog output signal, which is supplied to an analog-to-digital converter (see FIG. 3, ADC 30), is denoted by y(t). Methods for digitally further processing the digitized output signal (digital radar signal y[n]) to detect radar targets are known per se (for example Range Doppler analysis) and are thus not explained in more detail in this case.

In the present example, the mixer 104 down-converts the preamplified RF received signal $g \cdot y_{RF}(t)$ (e.g. the amplified antenna signal) to baseband. The mixing can take place in one stage (that is to say from the RF band directly to baseband) or over one or more intermediate stages (that is to say from the RF band to an intermediate-frequency band and on to baseband).

As already mentioned, the RF frontend 10 can have multiple TX channels and multiple RX channels integrated in different radar chips (MMICs). Since the output signals generated by the different TX channels (antenna signals) need to be coherent in most applications, the LO signal $s_{LO}(t)$ is usually generated in one of the radar chips (in the master MMIC), and this LO signal $s_{LO}(t)$ is distributed to the other radar chips (the slave MMICs).

Figure 5:
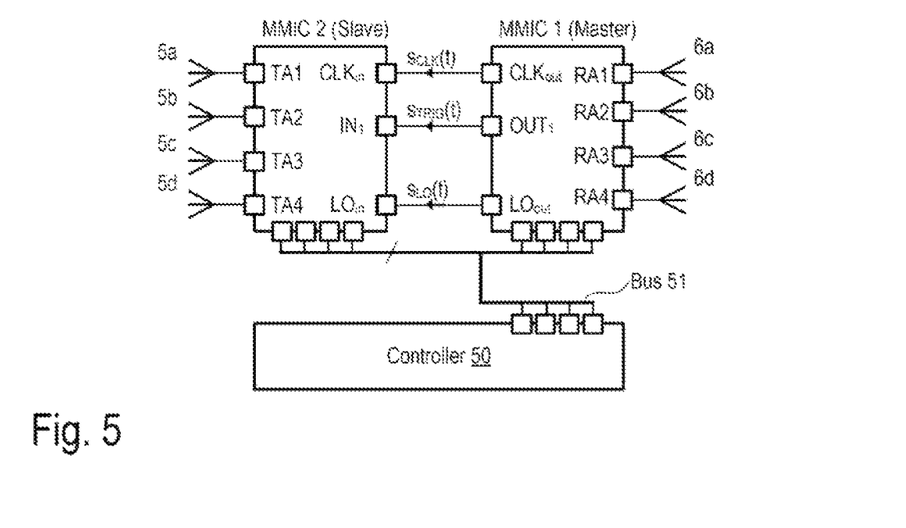
FIG. 5 is a block diagram to illustrate an example of a radar system having multiple radar chips (MMICs) and a system controller.

FIG. 5 illustrates an example of a radar system having two radar chips (MMICs). The radar chip in which the LO signal $s_{LO}(t)$ is generated (see FIG. 4, local oscillator 101) is referred to as the master MMIC 1. The other radar chip, which receives the LO signal $s_{LO}(t)$ from the master MMIC 1, is referred to as the slave MMIC 2. In the present example, the slave MMIC 2 has four TX channels integrated in it that each output an output signal on an RF contact of the chip (e.g. a solder ball). The RF contacts associated with the four TX channels are denoted by TA1, TA2, TA3 and TA4 in FIG. 5. The transmission antennas 5a, 5b, 5c and 5d are connected to the RF contacts TA1, TA2, TA3 and TA4. The slave MMIC 2 further has an RF contact that is referred to as an LO input $LO_{in}$ and at which the LO signal $s_{LO}(t)$ can be supplied. In addition, the slave MMIC 2 can have a clock input $CLK_{in}$ for receiving a system clock signal $s_{CLK}(t)$. This system clock signal $s_{CLK}(t)$ can be generated e.g. using a clock generator (e.g. a crystal oscillator or another oscillator type) or derived from another clock signal. Usually, the system clock signal $s_{CLK}(t)$ has a significantly lower frequency than the LO signal. The clock frequency $f_{CLK}$ of the system clock signal $s_{CLK}(t)$ can be e.g. between 50 MHz and 200 MHz. Higher or lower clock frequencies are also possible.

In the present example, the master MMIC 1 has four RX channels integrated in it that each receive an RF radar signal on an RF contact of the chip (e.g. a solder ball). The RF contacts associated with the four RX channels are denoted by RA1, RA2, RA3 and RA4 in FIG. 5. The reception antennas 6a, 6b, 6c and 6d are connected to the RF contacts RA1, RA2, RA3 and RA4. Each reception channel can be of identical or similar design to the reception channel RX1 in the example from FIG. 4. As mentioned, the master MMIC 1 contains the local oscillator 101 that generates the LO signal $s_{LO}(t)$ that is output on an RF contact $LO_{out}$ (LO output). The master MMIC 1 can also contain the aforementioned clock generator. In this case, the system clock signal $s_{CLK}(t)$ is output at the clock output $CLK_{out}$ of the master MMIC. In other example implementations, the clock generator can be integrated in another chip. In these cases, both the master MMIC 1 and the slave MMIC 2 have a clock input at which the clock signal is received. The trigger input $IN_1$ of the slave MMIC 2 and the trigger output $OUT_1$ of the master MMIC 1 will be explained in even more detail later.

The radar system shown in FIG. 5 also has a controller 50 that can be integrated in a separate chip (cf. also FIG. 3). The controller 50 can have a memory and a processor that is designed to load and execute software instructions stored in the memory. At least some of the functionality of the controller 50 can be implemented using software. In one example implementation, the controller 50 is a microcontroller. The controller 50 can use a bus 51 to communicate with the MMICs 1 and 2. In the present example implementation, the bus 51 is a serial bus, for example a Serial Peripheral Interface (SPI) bus. In other example implementations, however, other types of communication connections can also be used. It goes without saying that the radar system can also have three or more MMICs. In this case, the LO signal would be distributed from the master MMIC 1 to all the slave MMICs. Equally, the system clock signal would be distributed to all the slave MMICs. All the MMICs (slaves and master) are connected to the controller 50 via the bus 51 and can communicate with the controller 50.

In the present example, exclusively RX channels are arranged in the master MMIC 1 and exclusively TX channels are arranged in the slave MMIC 2. This does not necessarily have to be the case, however. Both the slave MMIC 2 and the master MMIC 1 can have TX channels and RX channels. However, in some applications, it can be worthwhile to provide for one or more slave MMICs that contain no RX channels. Such MMICs (without RX channels) normally have a lower level of complexity than radar chips having TX and RX channels and are therefore cheaper to produce. In the master MMIC 1, e.g. the output of a TX channel can be used as the LO output $LO_{out}$ at which the LO signal $s_{LO}(t)$ is output. The master MMIC 1 and the slave MMIC 2 can be arranged together with the controller 50 on a mounting board (e.g. PCB, printed circuit board). However, individual MMICs and/or the controller 50 can be arranged on separate circuit boards. In this case, the circuit boards can be connected using waveguides in order to transmit the LO signal $s_{LO}(t)$ from one circuit board to another circuit board.

In the case of radar systems having multiple MMICs, there is the problem of synchronizing the operation of the slave MMIC(s) 2 with the master MMIC 1. Synchronization is beneficial in particular for the timing of the chirps of a chirp sequence. The individual TX channels can be configured and a specific configuration associated with the respective chirp can be used for each individual chirp. This means that it is may be beneficial to change the configuration of the TX channels during a chirp sequence regularly and in sync with the chirps of the chirp sequence. In the case of known systems having multiple MMICs, this synchronization and regular configuration of the TX channels for producing the respective chirps can use a multiplicity of synchronization and trigger lines between the master MMIC 1 and the slave MMIC 2, which increases the number of chip contacts (e.g. pins, solder balls, etc.) and provides comparatively complex wiring of the MMICs on the circuit board.

Figure 6:
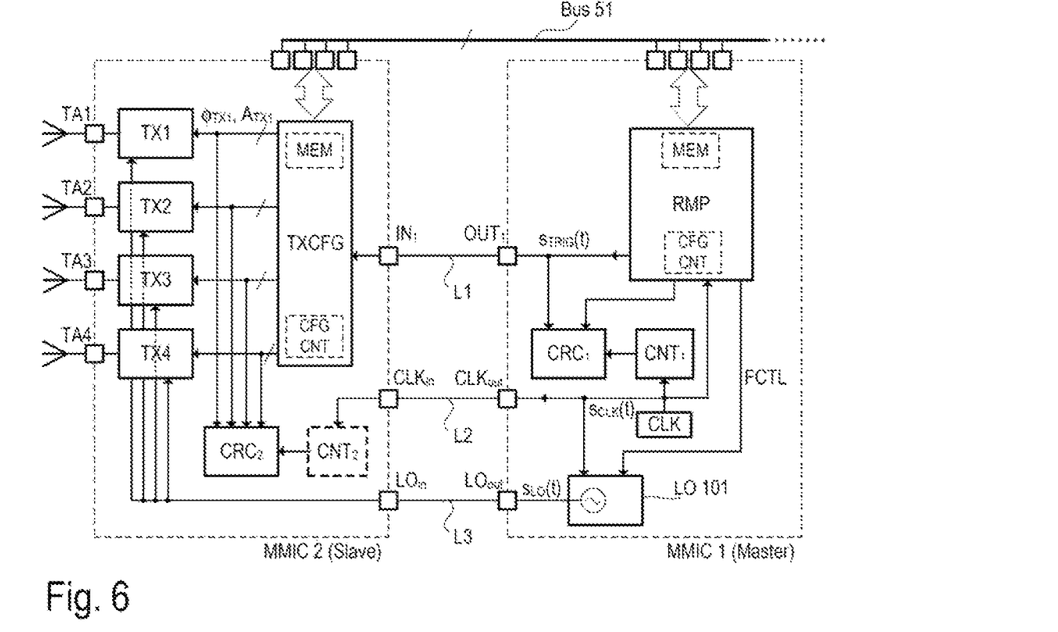
FIG. 6 illustrates a radar system having a master MMIC and a slave MMIC according to one example implementation.

FIG. 6 illustrates an example of a radar system as shown in FIG. 5 in more detail. In the depicted example, the master MMIC 1 and the slave MMIC 2 are implemented such that the aforementioned synchronization and configuration of the TX channels in the slave MMIC 2 can be performed comparatively easily. In order to keep FIG. 6 simple, the controller 50 is not depicted. Nevertheless, the system depicted in FIG. 6 comprises the controller 50, which can use the bus 51 to communicate with the master MMIC 1 and the slave MMIC 2. Master MMIC 1, slave MMIC 2 and controller 50 can be arranged on a mounting board. The output $OUT_1$ of the master MMIC 1 can be connected to the input $IN_1$ of the slave MMIC 2 using a line L1 arranged on the circuit board. Equally, the clock output $CLK_{out}$ of the master MMIC 1 can be connected to the clock input $CLK_{in}$ of the slave MMIC 2 using the line L2. The lines L1 and L2 can e.g. be in the form of strip lines. It goes without saying that differential signal transmission (e.g. LVDS, Low Voltage Differential Signaling) for each signal uses two chip contacts (pins, solder balls, etc.) and one line pair. The LO signal $s_{LO}(t)$ is transmitted from LO output $LO_{out}$ of the master MMIC 1 to the LO input $LO_{in}$ of the slave MMIC 2 using the RF line L3, which can likewise be a strip line.

As already mentioned earlier on, the master MMIC 1 has the local oscillator 101 with a tunable LO frequency $f_{LO}$ (cf. also FIG. 4). The local oscillator 101 contains for example a voltage controlled oscillator (VCO) in a phase-locked loop. The phase-locked loop can have what is known as a fractional-N frequency divider in the feedback loop of the phase-locked loop, the division ratio of said frequency divider being adjustable according to its digital control signal (frequency control signal FCTL). This means that the digital control signal determines the LO frequency $f_{LO}$ of the VCO. A fractional-N frequency divider can be e.g. formed by a multi-modulus divider actuated using a sigma-delta converter. Fractional-N frequency dividers of this kind and use thereof in a phase-locked loop are known per se and are not explained in more detail in this case.

The frequency modulation of the LO signal is achieved by virtue of the digital frequency control signal FCTL supplied to the local oscillator 101 being varied such that the local oscillator 101 produces the desired sequence of chirps. Each chirp of a chirp sequence can be defined by a set of chirp parameters (parameter set). An example of a set of chirp parameters is e.g. the starting frequency $f_{START}$, the stop frequency $f_{STOP}$, the ramp duration $t_{RAMP}$ and (optionally) also a pause duration $T_P$ that follows the chirp before the next chirp can be produced. The master MMIC 1 contains a digital control circuit, which in this case is referred to as a ramp control unit RMP (or as a "ramper" for short). The ramp control unit RMP is designed to take a multiplicity of sets of chirp parameters as a basis for generating a frequency control signal FCTL such that the local oscillator 101 generates an LO signal $s_{LO}(t)$ having a corresponding multiplicity of chirps (e.g. a chirp sequence). The aforementioned multiplicity of sets of chirp parameters can be stored e.g. in a memory of the ramp control unit RMP, wherein prior to the start of the radar operation the sets of chirp parameters can be received from the controller 50 via the bus 51 and stored in the ramp control unit RMP. The ramp control unit RMP is also responsible for the correct timing of the chirps and therefore operates in sync with the same system clock signal $s_{CLK}(t)$ as the phase-locked loop of the local oscillator 101 also uses.

Figure 7:
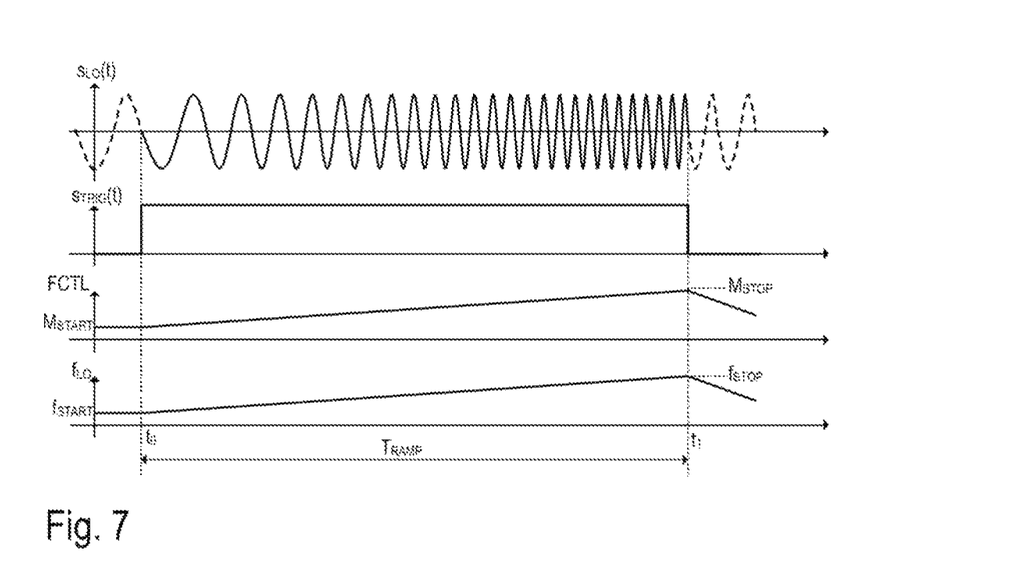
FIG. 7 uses example timing diagrams to illustrate the operation of the ramp control unit of the master MMIC.

The function of the ramp control unit RMP is explained more precisely with reference to the timing diagrams in FIG. 7. The first (from the top) timing diagram from FIG. 7 shows an example portion of the LO signal $s_{LO}(t)$ with a linear chirp, wherein the LO frequency $f_{LO}$ (see FIG. 7, fourth timing diagram) begins to rise at the time $t_0$. The frequency rise begins at the frequency $f_{START}$ and ends at the time $t_1 = t_0 + T_{RAMP}$ at the frequency $f_{STOP}$. The frequency $f_{LO}$ of the LO signal $s_{LO}(t)$ generated by the local oscillator 101 is controlled by the digital frequency control signal FCTL, which is generated by the ramp control unit RMP and represents the e.g. (rational) division ratio M of a fractional-N frequency divider used in the phase-locked loop of the local oscillator 101 (see FIG. 7, third timing diagram). For a frequency ramp from 76.8 GHz to 81.3 GHz ($\Delta f=4.5$ GHz), the division ratio M rises from 512 to 542 at a system clock frequency $f_{CLK}$ of 150 MHz (76.8 GHz/512=150 MHz, 81.3 GHz/542=150 MHz). The trigger signal $s_{TRIG}(t)$ output on the chip contact $OUT_1$ by the ramp control unit RMP indicates starting time $t_0$ (e.g. as a result of a rising edge of the signal $s_{TRIG}(t)$) and the end time $t_1$ (e.g. as a result of a falling edge of the signal $s_{TRIG}(t)$) of a chirp (see FIG. 7, second timing diagram). No later than immediately before the time $t_0$, the ramp control unit RMP loads and updates the set of chirp parameters that is used for producing the current chirp. The trigger signal $s_{TRIG}(t)$ can be a single-ended or a differential signal (e.g. an LVDS signal). In the latter case, a pair of chip contacts (in the master MMIC and in the slave MMIC) is needed for the trigger signal $s_{TRIG}(t)$.

Referring again to FIG. 6, the design and operation of the slave MMIC 2 is explained more specifically below. As mentioned, the slave MMIC 2 contains one or more TX channels, in the depicted example the TX channels TX1, TX2, TX3 and TX4. Each of these channels TX1, TX2, TX3 and TX4 can be of identical or similar design to the channel TX1 in the example from FIG. 4. This means that each TX channel can have an amplifier 102 (gain $A_{TX1}$, $A_{TX2}$, $A_{TX3}$, $A_{TX4}$) and a phase shifter 105 (phase $\phi_{TX1}$, $\phi_{TX2}$, $\phi_{TX3}$, $\phi_{TX4}$). The antenna signals that are output on the chip contacts TA1, TA2, TA3 and TA4 are each phase-shifted and amplified versions of the LO signal $s_{LO}(t)$ received at the LO input $LO_{in}$. As mentioned, there can be a desire to change the configuration of the TX channels TX1, TX2, TX3 and TX4 for each individual chirp of a chirp sequence. This configuration is brought about by a circuit that is referred to below as the configuration unit TXCFG. Similarly to the ramp control unit RMP in the master MMIC 1, the configuration unit TXCFG is designed to use the bus 51 to receive a multiplicity of parameter sets CFG[i] (configuration data) from the controller 50 (i=0, 1, 2, etc.), wherein each parameter set CFG[i] contains multiple configuration parameters for the TX channels TX1, TX2, TX3 and TX4, which are associated with a particular chirp of a chirp sequence. This association information containing the association of the chirps with a particular configuration parameter set CFG[i] is likewise part of the configuration data. These configuration parameter sets CFG[i] differ from the sets of chirp parameters that are used by the ramp control unit RMP.

The configuration parameter sets CFG[i] (configuration data) received by the configuration unit TXCFG via the bus 51 for one or more chirp sequences can be stored e.g. in a memory MEM of the configuration unit TXCFG. When sending a chirp sequence, it is then possible (as a reaction to a level change in the trigger signal $s_{TRIG}(t)$) for the i-th chirp of a chirp sequence to have the associated parameter set CFG[i] of configuration parameters loaded for it and for the TX channels TX1, TX2, TX3, and TX4 to be configured accordingly. In this case, the association information is simply in the order of the parameter sets CFG[i]. However, a more complex association is also possible, so that not every chirp requires precisely one parameter set CFG[i] to be transmitted and stored. The configuration parameters that a parameter set CFG[i] contains comprise e.g. the gains $A_{TX1}$, $A_{TX2}$, $A_{TX3}$, $A_{TX4}$ and phase shifts $\phi_{TX1}$, $\phi_{TX2}$, $\phi_{TX3}$, $\phi_{TX4}$ that are used in the TX channels TX1, TX2, TX3, and TX4. Initiating a configuration of multiple or all TX channels uses a single trigger signal $s_{TRIG}(t)$ and consequently, on the master MMIC 1, uses a single chip contact $OUT_1$ for configuring the TX channels. This reduces the number of chip contacts (pins/balls) needed both on the master MMIC and on the slave MMICs significantly (in particular when there are many TX channels and/or slave MMICs).

A further aspect of the example depicted in FIG. 6 is the verification of the correct execution of a chirp sequence using a circuit, which is referred to below as the hash calculation unit. Both the master MMIC 1 and the slave MMIC 2 can have a hash calculation unit. The hash calculation unit that the master MMIC 1 contains is denoted by $CRC_1$ and the hash calculation unit that the slave MMIC 2 contains is denoted by $CRC_2$. The operation of the hash calculation unit $CRC_2$ is explained more specifically below, with the hash calculation unit $CRC_1$ operating similarly. The hash calculation unit $CRC_2$ is designed to calculate a hash value based on a multiplicity of input parameters. The calculated hash value can be e.g. a checksum, wherein a multiplicity of different methods for calculating hash values are known. According to the example implementations described here, the cyclic redundancy check (CRC) can be used for calculating hash values (e.g. CRC-16 with a 16th degree generator polynomial). In other example implementations, other methods can be used, however. Various methods for calculating hash values are known per se and are thus not discussed further in this case.

The input parameters for the hash function hash(•) implemented by the hash calculation unit $CRC_2$ can contain the currently used configuration parameters. Additionally, the Boolean value (0 or 1) of the trigger signal $s_{TRIG}(t)$ can be taken into consideration as an input parameter. In order to "map" multiple chirps or all the chirps of a chirp sequence in a hash value, the calculation of a hash value can also involve the previously calculated hash value being taken into consideration as an input parameter. In this case, the hash value needs to be initialized (e.g. with 0xFFFF hexadecimal), so that this initial value can be taken into consideration as an input parameter for calculating the first hash value. Optionally, the input parameter taken into consideration for calculating the hash value can also be a counter value C2 used as a type of "timestamp". This counter value C2 can be provided e.g. by the counter $CNT_2$, which can be clocked by the system clock signal $s_{CLK}(t)$. In this case, the counter reading represents the time since the beginning of a chirp sequence. At the beginning of each chirp sequence, the counter $CNT_2$ can be reset (e.g. by a command received by the bus 51) for this purpose.

A new hash value CRC[i] can be calculated e.g. as a reaction to a level change (low to high or high to low) in the signal $s_{TRIG}(t)$. A level change at the time $t_k$ accordingly results in the k-th hash value CRC[k] being calculated. In the present example, the hash value CRC[k] can be calculated as follows:

$$CRC[k]=\text{hash}(CFG[i],s_{TRIG}(t_k),C2,CRC[k-1]), \text{ for } k=1,2,3, \text{ etc., where}$$

$$CRC[0]=0xFFFF.$$

The input parameters for the hash function hash(•) are accordingly the current configuration parameter set CFG[i], the Boolean value of the trigger signal $s_{TRIG}(t_i)$ immediately after a change at the time $t_k$, the timestamp (counter value C2) and the preceding hash value CRC[k−1], where CRC[0] is initialized with for example 0xFFFF (corresponds to 0b1111111111111111).

Figure 8:
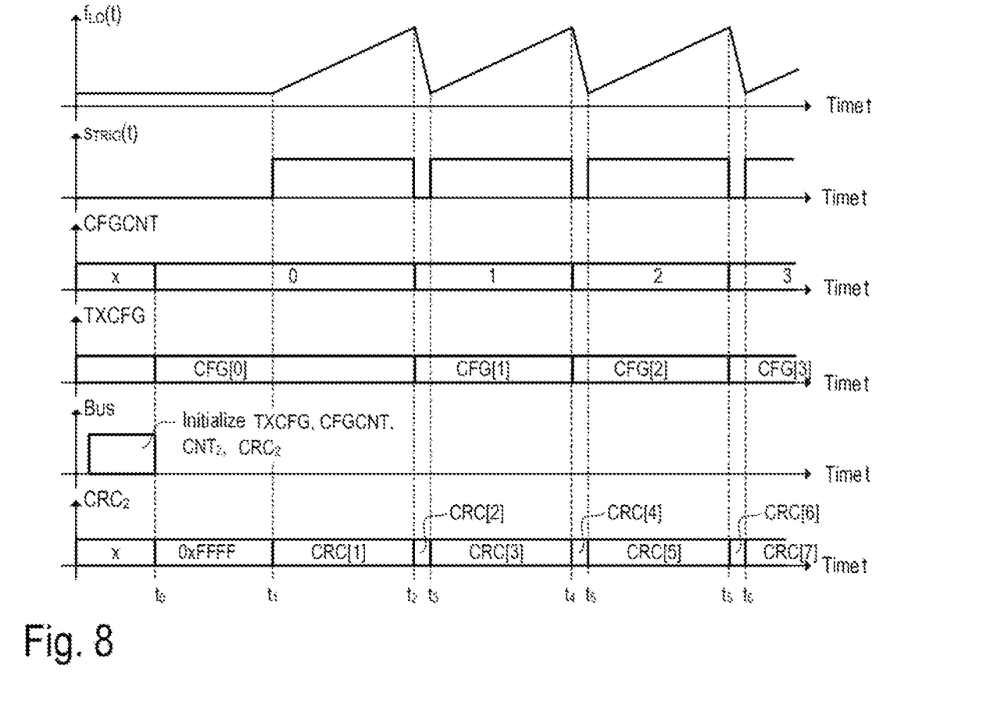
FIG. 8 uses example timing diagrams to illustrate the operation of the slave MMIC from the example from FIG. 6.

The operation of the configuration unit TXCFG and of the hash calculation unit $CRC_2$ is explained more specifically once again with reference to the timing diagrams from FIG. 8. The first timing diagram from FIG. 8 represents the instantaneous frequency $f_{LO}(t)$ of the local oscillator signal $s_{LO}(t)$ (cf. FIG. 7, fourth timing diagram) and the second timing diagram represents the associated trigger signal $s_{TRIG}(t)$ sent from the ramp control unit RMP (in the master MMIC 1) to the configuration unit TXCFG (in the slave MMIC 2). Before the first chirp of a chirp sequence (e.g. of time $t_0$), the bus 51 is used to transmit the configuration parameter sets CFG[i] to the configuration unit TXCFG, the hash value CRC[0] is initialized and a configuration counter CFGCNT and the counter $CNT_2$ are reset (e.g. to zero). The bus communication via the bus is depicted in the fifth timing diagram from FIG. 8. The counter reading of the configuration counter CFGCNT is shown in the third timing diagram from FIG. 8, and the currently selected configuration parameter set CFG[i] is depicted in the fourth timing diagram from FIG. 8 (i corresponds to the current counter reading of the configuration counter CFGCNT).

Before the time $t_1$, the counter reading of the configuration counter CFGCNT is zero and the TX channels are configured according to the configuration parameter set CFG[0]. The rising edge of the trigger signal $s_{TRIG}(t)$ at the time $t_1$ indicates the beginning of the first chirp, and the frequency-modulated LO signal $s_{LO}(t)$ is output via the TX channels TX1, TX2, TX3, and TX4, e.g. the resultant output signals are emitted via the associated antennas. Immediately after the rising edge at the time $t_1$, the first hash value CRC[1] is also calculated. The falling edge of the trigger signal $s_{TRIG}(t)$ at the time $t_2$ indicates the end of the first chirp. As a reaction to this falling edge, the counter reading of the configuration counter CFGCNT is incremented, and the TX channels TX1, TX2, TX3, and TX4 are configured according to the configuration parameter set CFG[1]. In addition, the next hash value CRC[2] is calculated.

The rising edge of the trigger signal $s_{TRIG}(t)$ at the time $t_3$ indicates the beginning of the second chirp, and the frequency-modulated LO signal $s_{LO}(t)$ is output via the TX channels TX1, TX2, TX3, and TX4. Immediately after the rising edge at the time $t_3$, the first hash value CRC[3] is also calculated. The falling edge of the trigger signal $s_{TRIG}(t)$ at the time $t_4$ indicates the end of the second chirp. As a reaction to this falling edge, the counter reading of the configuration counter CFGCNT is incremented, and the TX channels TX1, TX2, TX3, and TX4 are configured according to the configuration parameter set CFG[2]. In addition, the next hash value CRC[4] is calculated. In order to allow the transient response of the RF circuits in the TX channels TX1, TX2, TX3, and TX4, the new configuration is prompted in each case by the falling edge of the trigger signal $s_{TRIG}(t)$ (that is to say e.g. the phase shifts of the phase shifters are altered). Only on the rising edge of the trigger signal (e.g. after a certain transient period, e.g. $t_3-t_2$) are the output stages of the TX channels then activated, and at this time is a radar signal transmitted.

The rising edge of the trigger signal $s_{TRIG}(t)$ at the time $t_3$ indicates the beginning of the third chirp, and the frequency-modulated LO signal $s_{LO}(t)$ is output via the TX channels TX1, TX2, TX3 and TX4, etc. At the end of a chirp sequence having N chirps, the last hash value CRC[2·N] can be compared with a reference value calculated for the respective sequence in advance. If the hash value CRC[2·N] is concordant with the reference value, then the chirp sequence has been sent correctly.

The comparison of the last hash value CRC[2·N] with the reference value can be effected by a digital comparator in the slave MMIC 2. Alternatively, the hash value CRC[2·N] can also be transmitted via the bus to the controller 50, which performs the comparison with the reference value. At this juncture, it should be mentioned that in a further example implementation a hash value is calculated for each chirp and each of these hash values is compared with a reference value. In this case, the calculation of a hash value CRC[k] does not need to take into consideration the preceding hash value CRC[k−1] from the hash function. A comparison of the hash value with the reference value is thus performed for all the chirps of a chirp sequence, and a positive check on all the hash values results in the controller 50 being informed (e.g. by the hash calculation unit $CRC_2$) via the bus 51 or by a logic signal output on a dedicated pin about the correct transmitting of the chirps of a chirp sequence.

The hash calculation unit $CRC_1$ in the master MMIC 1 can operate in substantially the same way as the hash calculation unit $CRC_2$ in the slave MMIC 2, the input parameters for the hash function hash(•) being different in the hash calculation unit $CRC_2$ in the slave MMIC 2. The hash calculation unit $CRC_1$ can take into consideration e.g. the current chirp parameters when calculating the hash values. A "timestamp" and the Boolean value of the trigger signal $s_{TRIG}(t)$ can be taken into consideration in the same manner as in the hash calculation unit $CRC_2$.

Figure 9:
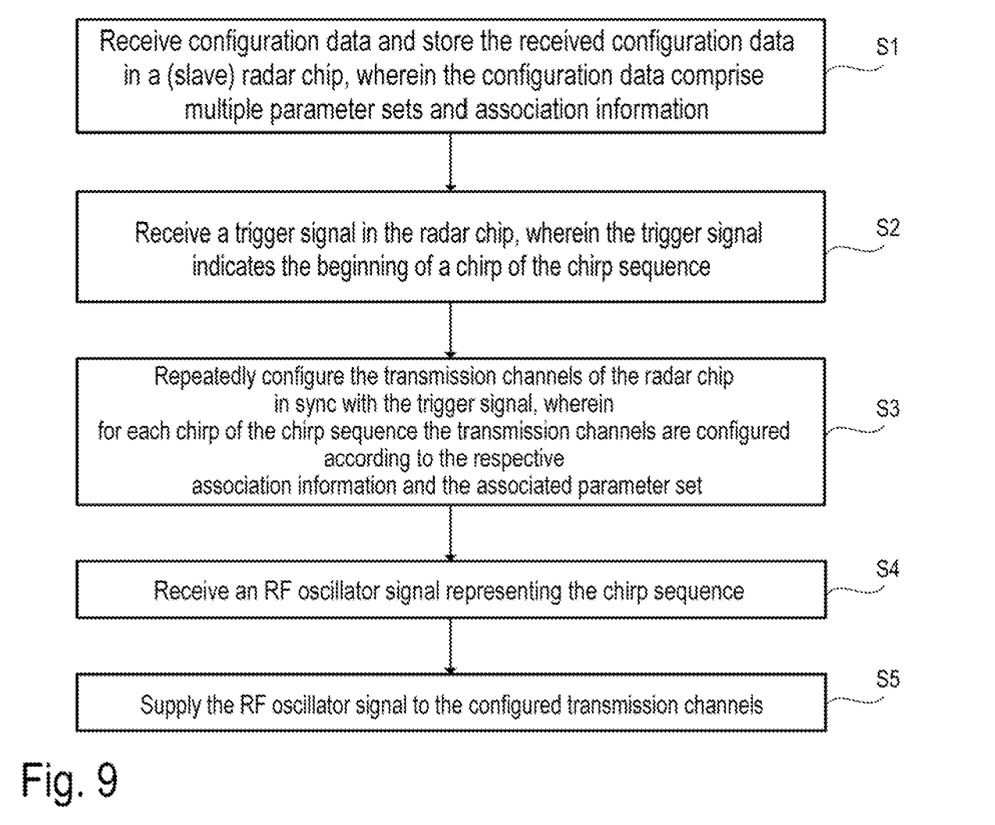
FIG. 9 is a flowchart to illustrate an example of the method described here.

The flowchart in FIG. 9 is used to summarize an example of the method performed e.g. using the slave MMIC 2 shown in FIG. 6. What follows is not a complete but rather just an example explanation of the method performed, which do not necessarily have to be performed in the order described here. According to FIG. 9, configuration data are received in a radar chip (e.g. the slave MMIC 2), and the received configuration data are stored (FIG. 9, block S1). The radar chip has multiple transmission channels (see e.g. FIG. 6, TX1, TX2, TX3, TX4), wherein the configuration data comprise multiple parameter sets CFG[i] for a chirp sequence and association information. The association information represents an association between the chirps of the chirp sequence and one of the multiple parameter sets CFG[i]. As mentioned earlier on, this association information can be in the order (e.g. in the indexing) of the parameter sets CFG[i].

The method further comprises receiving a trigger signal in the radar chip, wherein this trigger signal (cf. FIG. 7, trigger signal $s_{TRIG}(t)$) indicates the beginning of the chirps of the chirp sequence (FIG. 9, block S2), and the repeated configuration of the transmission channels in sync with the trigger signal. In this case, for each chirp of the chirp sequence the transmission channels are configured according to the respective association information with the associated parameter set CFG[i] (FIG. 9, block S3). An RF oscillator signal (cf. FIG. 7, LO signal $s_{LO}(t)$) representing the chirp sequence in the radar chip (FIG. 9, block S4) and the RF oscillator signal are supplied to the configured transmission channels (FIG. 9, block S5). As mentioned, the flowchart from FIG. 9 does not imply a necessary order for the depicted processes/subprocesses. In particular, blocks S2 to S5 proceed practically at the same time, as can also be seen in the timing diagram in FIG. 8.

Figure 10:
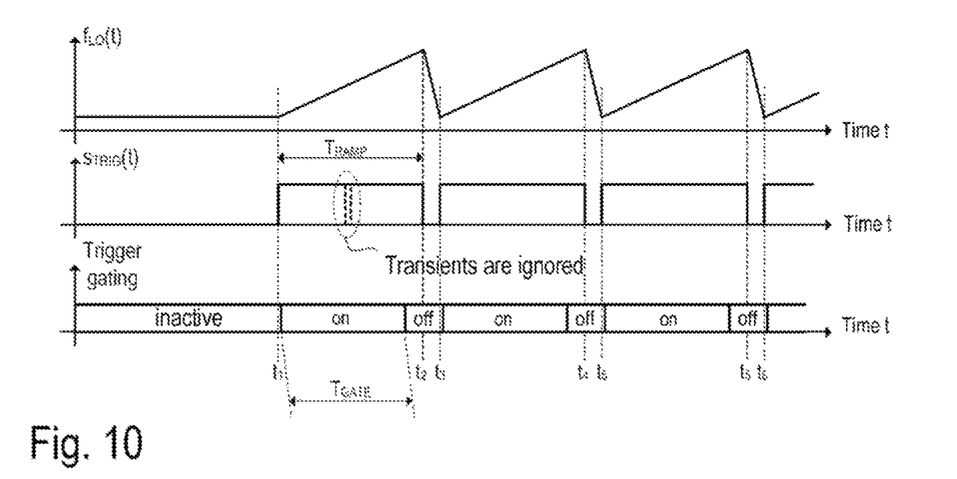
FIG. 10 uses example timing diagrams to illustrate how a gating signal can be used to reduce susceptibility to interference.

FIG. 10 uses example timing diagrams to illustrate how a gating signal can be used to reduce susceptibility to interference. The first two timing diagrams of FIG. 10 are substantially the same as the first two timing diagrams of FIG. 8. A gating signal prevents the unintentional configuration of the TX channels during a time window $T_{GATE}$ after the starting of a chirp on account of undesirable transient interference impulses on the chip contact $IN_1$ of the slave MMIC 2. Such interference impulses can be overlaid on the trigger signal $s_{TRIG}(t)$, as depicted in the second timing diagram of FIG. 10. The effect of the gating signal is that during the time window/time interval $T_{GATE}$ that immediately follows an (e.g. rising) edge of the trigger signal $s_{TRIG}(t)$ indicating the start of a chirp, further edges of the trigger signal $s_{TRIG}(t)$ are ignored. Edges that occur after the time window $T_{GATE}$ (e.g. at the time $t_2$) are taken into consideration again. The length of the time window $T_{GATE}$ can be adjusted and regularly updated (e.g. for each chirp sequence) e.g. digitally by the controller 50 via the bus 51.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
receiving, by a first radar chip, configuration data and storing the configuration data in the first radar chip having multiple transmission channels,
wherein the configuration data includes multiple parameter sets for a chirp sequence and association information representing an association of a respective chirp of the chirp sequence with one of the multiple parameter sets;
receiving, by the first radar chip, a trigger signal indicating a beginning of the respective chirp of the chirp sequence;
repeatedly configuring, by the first radar chip, the transmission channels in sync with the trigger signal to obtain configured transmission channels,
wherein, for each chirp of the chirp sequence, the transmission channels are configured according to the association information;
receiving, by the first radar chip and from a second radar chip, a radio-frequency (RF) oscillator signal representing the chirp sequence;
supplying, by the first radar chip, the RF oscillator signal to the configured transmission channels; and
calculating a hash value based on a change of state of the trigger signal, based on the state of the trigger signal, and based on a parameter set, of the multiple parameter sets, to which a present configuration of the one or more of the transmission channels corresponds,
wherein the hash value is initialized and a preceding hash value is taken into consideration for calculating the hash value.

2. The method as claimed in claim 1, further comprising:
generating multiple antenna signals,
wherein one of the antenna signals is generated in one or more of the transmission channels based on the RF oscillator signal and based on the present configuration of the one or more of the transmission channels.

3. The method as claimed in claim 1, further comprising:
comparing the hash value with a reference value at an end of the chirp sequence or after a predetermined number of chirps.

4. The method as claimed in claim 1,
wherein each of the multiple parameter sets includes at least one of: a phase shift for each of the transmission channels or a gain for each of the transmission channels.

5. The method as claimed in claim 1,
wherein the configuration data is received as digital configuration data via a bus and the digital configuration data is stored in a memory of the first radar chip.

6. The method as claimed in claim 1,
wherein configuring the transmission channels is initiated only by the trigger signal, and
wherein the trigger signal is a single-ended signal or a differential signal.

7. A first radar chip comprising:
a radio-frequency (RF) chip contact to receive an external RF radar signal representing a chirp sequence having a multiplicity of chirps;
a further chip contact to receive a trigger signal from a second radar chip,
wherein the trigger signal indicates a beginning of a respective chirp of the chirp sequence;
multiple transmission channels coupled to the RF chip contact, and designed to receive the RF radar signal;
a communication interface to receive configuration data, wherein the configuration data includes multiple parameter sets for the chirp sequence and association information representing an association of the respective chirp of the chirp sequence with one of the multiple parameter sets;
a configuration circuit coupled to the communication interface to receive the configuration data, and coupled to the further chip contact to receive the trigger signal,
wherein the configuration circuit is designed to repeatedly configure the transmission channels in sync with the trigger signal, and
wherein, for each chirp of the chirp sequence, the transmission channels are configured according to the association information; and
a hash calculation unit coupled to the configuration circuit and designed to react to any change of state of the trigger signal by taking the state of the trigger signal and a parameter set, of the multiple parameter sets, to which a present configuration of the transmission channels corresponds, as a basis for calculating a hash value,
wherein the hash calculation unit is coupled to the communication interface and designed to initialize the hash value based on a reset command received via the communication interface.

8. The first radar chip as claimed in claim 7,
wherein the transmission channels are designed to generate antenna signals based on the RF radar signal and the present configuration of the transmission channels.

9. The first radar chip as claimed in claim 7,
wherein the hash calculation unit is designed so as, at an end of a chirp sequence or after a predetermined number of chirps, to make the hash value available via the communication interface or to compare the hash value with a reference value.

10. A radar apparatus having:
a bus;
a first radar chip comprising:
a radio-frequency (RF) chip contact to receive an external RF radar signal representing a chirp sequence having a multiplicity of chirps;
a further chip contact to receive a trigger signal from a second radar chip,
wherein the trigger signal indicates a beginning of a respective chirp of the chirp sequence;
multiple transmission channels coupled to the RF chip contact, and designed to receive the RF radar signal;
a communication interface to receive configuration data, wherein the configuration data includes multiple parameter sets for the chirp sequence and association information representing an association of the respective chirp of the chirp sequence with one of the multiple parameter sets, for each chirp of the chirp sequence,
wherein the communication interface is coupled to the bus; and a configuration circuit coupled to the communication interface to receive the configuration data, and coupled to the further chip contact to receive the trigger signal,
  wherein the configuration circuit is designed to repeatedly configure the transmission channels in sync with the trigger signal, and
  wherein, based on the trigger signal for each chirp of the chirp sequence, the transmission channels are configured according to the association information;
a controller coupled to the bus, wherein the controller is designed to transmit the configuration data to the configuration circuit in the first radar chip via the bus; and
the second radar chip comprising:
  an RF chip contact coupled to the RF chip contact of the first radar chip,
  a further chip contact coupled to the further chip contact of the first radar chip, and
  a ramp control unit designed to generate the trigger signal and to output the trigger signal at the further chip contact of the second radar chip, and
  a local oscillator designed to generate the RF radar signal in sync with the trigger signal and to output the RF radar signal at the RF chip contact of the second radar chip.

11. The radar apparatus as claimed in claim 10, wherein the second radar chip is coupled to the bus.

12. The radar apparatus as claimed in claim 10, wherein the transmission channels are designed to generate antenna signals based on the RF radar signal and a present configuration of the transmission channels.

13. The radar apparatus as claimed in claim 10, wherein the first radar chip further comprises:
  a hash calculation unit coupled to the configuration circuit and designed to determine a change of state of the trigger signal, and designed to calculate a hash value based on the state of the trigger signal and a parameter set, of the multiple parameter sets, to which a present configuration of the transmission channels corresponds.

14. The first radar chip as claimed in claim 7, wherein each of the multiple parameter sets includes at least one of: a phase shift for one or more of the transmission channels or a gain for one or more of the transmission channels.

15. The first radar chip as claimed in claim 7, wherein the configuration data is received as digital configuration data via a bus and the digital configuration data is stored in a memory of the first radar chip.

16. The first radar chip as claimed in claim 7, wherein the configuration circuit is designed to configure the transmission channels based only on the trigger signal, and
wherein the trigger signal is a single-ended signal or a differential signal.

17. The method as claimed in claim 1, wherein the transmission channels are configured according to the association information based on the trigger signal for each chirp of the chirp sequence.

18. The method as claimed in claim 1, wherein the multiple parameter sets are received via a bus, and
wherein the bus is associated with a controller configured to transmit the configuration data to the first radar chip.

19. The first radar chip as claimed in claim 7, wherein the multiple parameter sets are received via a bus, and
wherein the bus is associated with a controller configured to transmit the configuration to the first radar chip.

20. The first radar chip as claimed in claim 7, wherein the multiple transmission channels are configured according to the association information based on the trigger signal for each chirp of the chirp sequence.

* * * * *